April 29, 1930.  C. A. HOXIE  1,756,863
METHOD OF MAKING MOTION PICTURE FILMS
Filed Dec. 2, 1926
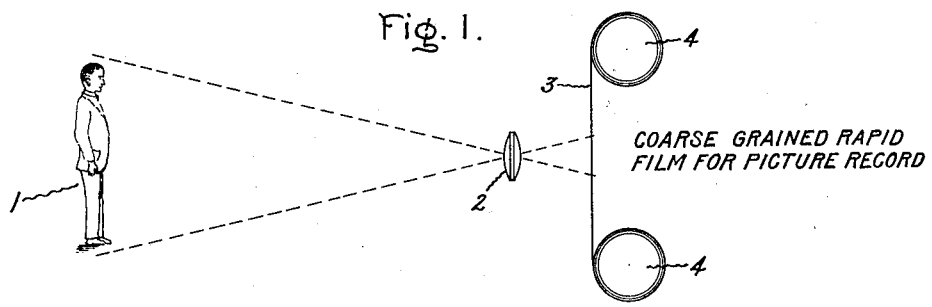
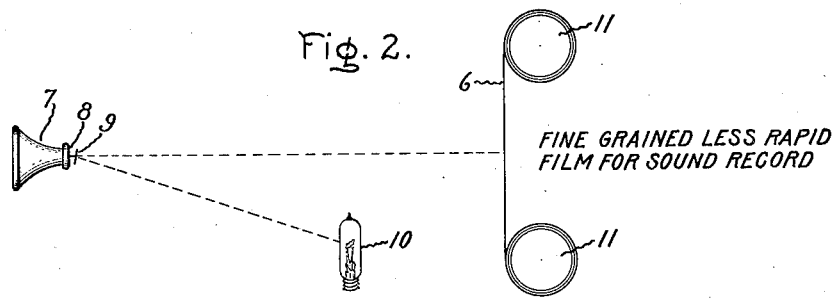
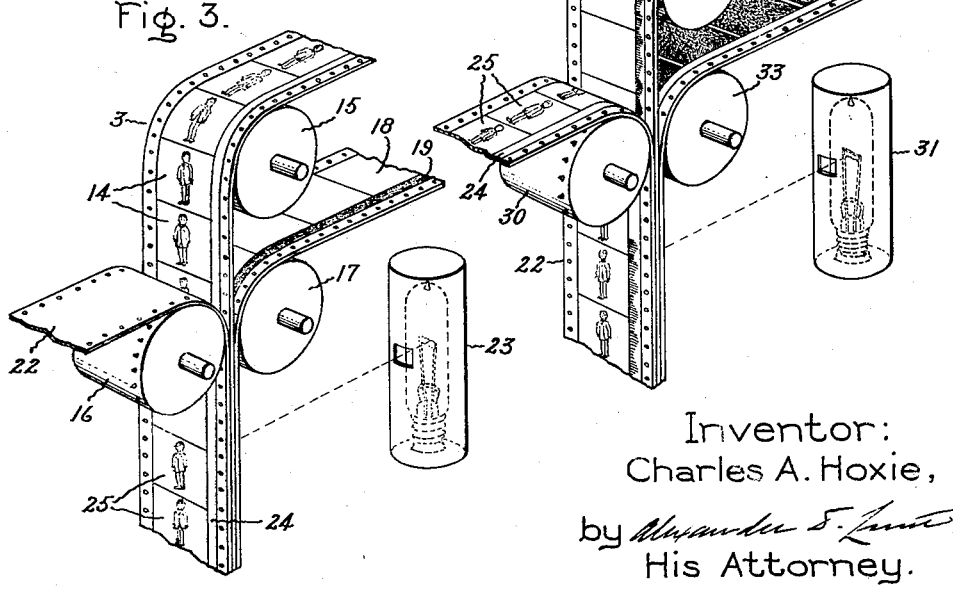
Inventor:
Charles A. Hoxie,
by *Alexander F. [Smith]*
His Attorney.

Patented Apr. 29, 1930

1,756,863

UNITED STATES PATENT OFFICE

CHARLES A. HOXIE, OF SCHENECTADY, NEW YORK, ASSIGNOR TO GENERAL ELECTRIC COMPANY, A CORPORATION OF NEW YORK

METHOD OF MAKING MOTION-PICTURE FILMS

Application filed December 2, 1926. Serial No. 152,248.

My invention relates to talking motion pictures and particularly to the film record from which motion pictures and accompanying sounds may be produced simultaneously, and an object of my invention is to provide an improved method of making a combined film record of pictures and accompanying sounds.

In accordance with my invention, I make the picture record on a film which is especially adapted to meet the needs of picture recording and make the sound record on a film which is especially adapted to meet the needs of sound recording. These separate records are then combined on a single film from which the pictures and accompanying sounds may be reproduced simultaneously without variation in synchronism. On account of the very short exposure which must be given to each separate picture in making a motion picture film, the film must be sensitized with an emulsion which is extremely rapid in order that the pictures may show the necessary detail. Such a film is known in the art as a "negative" film. It has an emulsion of which the sensitive element is in relatively coarse grains, the speed of the emulsion varying to a certain extent with the size of the grain. While such "negative" or coarse grained films are entirely satisfactory for picture recording, I have found that they are not so satisfactory for sound recording for the reason that when sound records made thereon are reproduced there is an objectionable amount of "ground noise" present, which when panchromatic film is used for the picture negative is still more prominent. I have found that when the sound record is made on a slower, relatively fine grained film the ground noise is greatly reduced, if not lost entirely. For making the sound record, the speed characteristic of the film is not so essential since a sufficient light may be readily provided to effect a proper exposure of the film. A somewhat slower, relatively fine grained film, such as that mentioned above, is termed in the art a "positive" film, being the kind of film in which the picture records are printed to make positives for reproduction. In accordance with the method which I have devised therefore, I make the picture record on a negative or coarse grained rapid film and make the sound record on a positive or fine grained less rapid film. These two records I then combine. This may be done in several ways. In accordance with the way which I have chosen to illustrate, the picture and sound records are printed from their respective films on a third film which is a positive or fine grained film, the pictures and sounds being properly related for synchronous reproduction.

My invention will be better understood from the following description taken in connection with the accompanying drawing, and its scope will be pointed out in the appended claims.

In the accompanying drawing I have illustrated diagrammatically one form of apparatus by means of which my invention may be carried out. Fig. 1 is a diagram of apparatus by which pictures may be recorded on a "negative" film; Fig. 2 is a diagram of apparatus by which sounds may be recorded on a "positive" film having uniform motion; and Figs. 3 and 4 are diagrams of apparatus for printing the separate picture and sound records on a third or "positive" film.

In Fig. 1 the image of the object 1 is formed by the lens 2 on the film 3. By suitable means well known in the art but not shown on the drawing, the film may be advanced intermittently, being unwound from one of the two reels 4 and wound up on the other while a suitable shutter may allow the intermittent formation of the image on the film. Such apparatus, as well as apparatus which does not require the intermittent movement of the film, is of course well known and therefore requires no further explanation. The film 3, which is used for making the picture record is extremely rapid, having an emulsion of which the sensitive element has a relatively coarse grain. Such a film is commonly termed in the art a "negative" film, and is the kind of film usually employed in making the original or negative moving picture record.

In Fig. 2 the sound record is being made on the film 6, the apparatus shown being a modified form of that illustrated in my Letters Patent 1,598,377, granted to General Electric Company on August 31, 1926. The sound receiving device 7 has a diaphragm 8 to which is attached the mirror 9, which is mounted to rock on a pivot and reflect a beam of light from the light source 10 on the film 6. Vibration of the diaphragm causes the light beam reflected by the mirror to vibrate transversely of the length of the film rather than longitudinally thereof, as Fig. 2 might seem to indicate, the drawing in this particular case being purposely distorted to simplify the illustration. Film 6, which by suitable means not shown, is caused to travel steadily from one reel 11 to the other, is sensitized by an emulsion in which the sensitive elements have a relatively fine grain. Since sufficient light is always available for making the sound record, the film may be less rapid than the film used for making the picture record.

The separate picture and sound records may be made simultaneously, the driving mechanism for the picture and sound record films being operated in synchronism, or, if desired, the sound record may be made subsequently to the making of the picture record but suitably timed therewith, the rate of movement of the sound film being equal to the average rate of movement of the picture film in the case where the latter is moved intermittently. It is immaterial, however, to my present invention whether the picture and sound records are made at the same time or at different times.

The next step in the method involving my invention is to combine the picture and sound records on a single film, thereby to facilitate the handling of the records and the reproduction of the recorded pictures and sounds in proper synchronism. Figs. 3 and 4 will serve to illustrate diagrammatically one means whereby this step may be carried out. Film 3, which having been developed, has the successive negative pictures 14 of the object 1, is shown carried over the roller or sprocket wheel 15 and down between two other rollers or sprocket wheels 16 and 17. Supposing now that the sound record was made along one edge of the sound film 6 just inside of the row of sprocket holes therein, I provide a second film 18 constituting a mask, preferably similar to film 3 but transparent except along one edge where it is opaque in a narrow strip 19. The narrow opaque strip 19 corresponds in width and position on the film to the sound record made on the sound film 6, and the film 18 having the opaque strip 19 is carried over roller 17, proceeding downwardly therefrom in contact with film 3. The third film 22 on which both the picture and sound records are to be printed, is carried over roller 16 and thence downwardly in contact with film 3. This film like sound record film 6 is a "positive" film, having a relatively fine grain and not necessarily as rapid as the original picture film. As the three films pass downwardly from between the rollers 16 and 17 a contact print of the picture record is made on film 22 in a well known manner, suitable means, not shown on the present diagrammatic showing, being employed to hold the films in close contact while they pass the source of light 23. While the pictures 14 are being printed on film 22, the presence of film 18 having the opaque strip 19 thereon leaves an unexposed strip 24 along the edge of film 22 where it was shielded from the light. The printed pictures 25 and the unexposed strip 24 would of course not be visible on the undeveloped film 22, but they have nevertheless been indicated on the drawing to facilitate the understanding of the invention.

The film 22 having been exposed to receive the picture record 25 and having an unexposed marginal strip 24 thereon, is now ready to receive the sound record. For this purpose I employ a printing arrangement shown diagrammatically in Fig. 4 similar to that shown in Fig. 3. Here film 6 having the sound record 28 formed along one margin thereof, the remainder being transparent, is shown carried over the roller or sprocket wheel 29 and down in contact with film 22 which runs over roller 30 and upon which has been printed the picture record. In order to shield the picture portion of film 22 from light from source 31 during the printing of the sound record thereon, a masking film 32 is carried over roller 33 and down in contact with film 6. Film 32 has the central or picture portion thereof opaque while the marginal portion corresponding to the sound record 28 of film 22 is transparent. Thus as the three films 22, 6 and 32 pass before the light source 31 the sound record is printed upon the margin of film 22, which after being developed, is ready for use in a suitable picture-sound reproducing apparatus. Inasmuch as each portion of the film will pass successively through the picture and the sound reproducing devices, the corresponding portions of the picture and sound records should be printed on the film with the proper relative displacement in accordance with the length of the film loop between these devices. Suitable means, as for example, masks on the film, may also be provided for properly locating the films with respect to each other when printing to insure the desired synchronism of action and accompanying sounds. Obviously, either the picture or the sound record may be the first to be printed on film 22, and instead of employing two separate printing devices, as illustrated, a single printing device may be provided through which the various films are carried so that in a single pass of the films the printing of both picture and sound records may be effected.

What I claim as new and desire to secure by Letters Patent of the United States is:—

1. The method of making talking motion picture films which comprises recording the pictures on "negative" films, recording the sound on "positive" films, and combining the picture and sound records thus made on "positive" films.

2. The method of making a film having moving picture and sound records thereon which comprises making a picture record on a film which is particularly adapted by reason of its speed for the making of the original picture record, making a sound record on a five-grained film which is particularly adapted by reason of its structure for recording sound, and printing the picture and sound records thus made on a third film similar to the sound record film.

3. The method of making a moving picture film having a sound record thereon which comprises making a picture record on a relatively coarse grained rapid film, making a sound record on a relatively fine grained less rapid film and printing the picture and sound records thus made on a third fine grained film.

In witness whereof, I have hereunto set my hand this 1st day of December, 1926.

CHARLES A. HOXIE.

CERTIFICATE OF CORRECTION.

Patent No. 1,756,863.  Granted April 29, 1930, to

CHARLES A. HOXIE.

It is hereby certified that error appears in the printed specification of the above numbered patent requiring correction as follows: Page 3, line 17, claim 2, for the hyphenated word "five-grained" read "fine-grained"; and that the said Letters Patent should be read with this correction therein that the same may conform to the record of the case in the Patent Office.

Signed and sealed this 24th day of June, A. D. 1930.

M. J. Moore,
Acting Commissioner of Patents.

(Seal)